(12) United States Patent
Le Corre

(10) Patent No.: US 10,875,549 B2
(45) Date of Patent: Dec. 29, 2020

(54) TABLE FOR VEHICLE

(71) Applicant: ALSTOM TRANSPORT TECHNOLOGIES, Saint-Ouen (FR)

(72) Inventor: Dominique Le Corre, Val de Moder (FR)

(73) Assignee: Alstom Transport Technologies, Saint-Ouen (FR)

( * ) Notice: Subject to any disclaimer, the term of this patent is extended or adjusted under 35 U.S.C. 154(b) by 0 days.

(21) Appl. No.: 16/653,638

(22) Filed: Oct. 15, 2019

(65) Prior Publication Data
US 2020/0114938 A1 Apr. 16, 2020

(30) Foreign Application Priority Data
Oct. 15, 2018 (FR) ...................................... 18 59514

(51) Int. Cl.
*B61D 37/00* (2006.01)
*A47B 1/04* (2006.01)
*B60N 3/00* (2006.01)

(52) U.S. Cl.
CPC ................ *B61D 37/00* (2013.01); *A47B 1/04* (2013.01); *B60N 3/002* (2013.01)

(58) Field of Classification Search
CPC .. B61D 37/00; A47B 1/04; A47B 1/05; A47B 1/08; B60N 3/002; B60N 2205/30; B60N 3/001; B60N 3/004; B64D 11/0619
See application file for complete search history.

(56) References Cited

U.S. PATENT DOCUMENTS

| | | | | |
|---|---|---|---|---|
| 2,203,027 A | * | 6/1940 | Onsrud | A47B 1/04 144/254 |
| 2,358,174 A | * | 9/1944 | McFall | A47B 1/04 108/77 |
| 2,522,602 A | * | 9/1950 | Burns | B60N 3/002 281/12 |
| 2,773,705 A | * | 12/1956 | Hirak | B60N 3/002 108/5 |

(Continued)

FOREIGN PATENT DOCUMENTS

| | | |
|---|---|---|
| DE | 10 2011 118755 | 5/2013 |
| FR | 2898090 | 9/2007 |

(Continued)

OTHER PUBLICATIONS

Search Report for French Application No. FR 1859514, dated Jun. 6, 2019.

*Primary Examiner* — Hanh V Tran
(74) *Attorney, Agent, or Firm* — Knobbe, Martens, Olson & Bear, LLP

(57) ABSTRACT

A table for vehicle includes a tray, at least one extendible leaf mounted movably on the tray between a deployed position and a withdrawn position. The extendible leaf is mounted translatably on the tray between the deployed position and the withdrawn position. The table further includes at least one rotatable leaf mounted rotatably on the extendible leaf between an idle position and a deployed position, and means for coupling movements of the second and rotatable leafs, which are configured to rotate the rotatable leaf from its idle position to its deployed position when the extendible leaf is translated from its deployed position to its withdrawn position.

10 Claims, 3 Drawing Sheets

(56) References Cited

U.S. PATENT DOCUMENTS

| | | | | |
|---|---|---|---|---|
| 3,672,312 | A * | 6/1972 | Pettit | A47B 1/04 108/69 |
| 4,646,654 | A * | 3/1987 | Sullivan | A47B 13/023 108/66 |
| 4,735,151 | A * | 4/1988 | Bisbing | A47B 1/04 108/63 |
| 4,750,432 | A * | 6/1988 | McNamara | A47B 31/04 108/69 |
| 4,927,140 | A * | 5/1990 | Pappas | A63D 15/045 473/11 |
| 4,993,109 | A * | 2/1991 | Stevens | E05D 5/02 16/379 |
| 5,193,465 | A * | 3/1993 | Delaye | A47B 1/04 108/66 |
| 5,513,578 | A * | 5/1996 | Tordsen | A47B 1/04 108/147.19 |
| 6,659,879 | B1 * | 12/2003 | Cartwright | A47B 13/083 108/90 |
| 6,729,982 | B1 * | 5/2004 | Appelbaum | A63B 67/002 108/11 |
| 9,675,169 | B1 * | 6/2017 | Lai | A47B 13/088 |
| 10,596,942 | B2 * | 3/2020 | Hoggarth | B60N 3/001 |
| 2009/0050659 | A1 * | 2/2009 | Chou | B60N 2/42727 224/282 |
| 2012/0049558 | A1 * | 3/2012 | Souillac | B60R 11/00 296/37.12 |
| 2013/0104781 | A1 * | 5/2013 | Smith | A47B 1/04 108/50.11 |
| 2014/0338572 | A1 * | 11/2014 | Schiefer | B61D 37/00 108/77 |
| 2015/0366337 | A1 * | 12/2015 | Luebke | A47B 3/083 108/44 |
| 2016/0039525 | A1 * | 2/2016 | Pajic | H02J 7/025 108/44 |
| 2016/0227922 | A1 * | 8/2016 | Khiabani | A47B 13/023 |
| 2016/0324308 | A1 * | 11/2016 | Carrera Gonzalez | A47B 1/05 |
| 2016/0375810 | A1 * | 12/2016 | Kong | B60N 2/793 297/145 |
| 2017/0166141 | A1 * | 6/2017 | Pajic | H02J 7/025 |
| 2017/0355465 | A1 | 12/2017 | Trimble | |
| 2018/0050642 | A1 * | 2/2018 | Waddell | B60R 5/045 |
| 2018/0118342 | A1 * | 5/2018 | Kasparian | B64D 11/0015 |
| 2018/0170549 | A1 * | 6/2018 | Jussli | B64D 11/00153 |

FOREIGN PATENT DOCUMENTS

| | | | |
|---|---|---|---|
| GB | 2433435 | 6/2007 | |
| WO | WO 14/154666 | 10/2014 | |
| WO | WO 2016/146325 | 9/2016 | |
| WO | WO-2016166027 A1 * | 10/2016 | ....... B64D 11/00152 |

* cited by examiner

TABLE FOR VEHICLE

CROSS-REFERENCE TO RELATED APPLICATION

This application claims priority to French Patent Application No. 18 59514 filed on Oct. 15, 2018, the disclosure of which including the specification, the drawings, and the claims is hereby incorporated by reference in its entirety.

FIELD OF THE INVENTION

The present invention relates to a table for vehicle, of the type comprising:
- a tray, suitable for being secured to the vehicle,
- at least one extendible leaf, mounted movably on the tray between a deployed position and a withdrawn position.

BACKGROUND OF THE INVENTION

Table devices for vehicle of the aforementioned type are known. Such tables are in particular used in trains. The use of movable elements is suitable for providing usage flexibility, in particular for allowing passengers to have a variable work surface, depending on their needs, as well as to facilitate access to seated places.

PRIOR ART

US 2014/0338572 A1 describes such a table, comprising a movable element, capable of sliding below a table element, or being removed from this position to increase the work surface provided by the table.

Such a table is not fully satisfactory. During a sudden stop or acceleration, a passenger could come into contact with an end of the table. This end may exert significant pressure on the passenger, which may cause a serious injury. The possibility of such a collision is higher when the movable part is deployed.

SUMMARY OF THE INVENTION

One aim of the invention is to better protect passengers during sudden stops or accelerations of a train provided with tables having movable parts. Another aim is to create additional spaces in order to facilitate access to seated places for passengers with reduced mobility.

To that end, the invention relates to a table of the aforementioned type, wherein the extendible leaf is mounted translatably on the tray between the deployed position and the withdrawn position, and wherein the table further includes:
- at least one rotatable leaf mounted rotatably on the extendible leaf between an idle position and a deployed position,
- a hinge provided to coupling movements of the second and rotatable leafs, configured to rotate the rotatable leaf from its idle position to its deployed position when the extendible leaf is translated from its deployed position to its withdrawn position.

In specific embodiments of the invention, the table further has one or more of the following features, considered alone or according to any technically possible combination(s):
- the rotatable leaf is in direct contact with the tray during its rotation from its idle position to its deployed position.
- the tray comprises at least one guideway configured to receive the extendible leaf, the guideway authorizing a translational movement of the extendible leaf relative to the tray between the deployed position and the withdrawn position to the exclusion of any other movement.
- the angle between the idle position and the deployed position of the rotatable leaf is between 80° and 95°.
- the extendible leaf is mounted movably in rectilinear translation along a directly parallel to an elongation direction of the tray.
- the extendible leaf extends, along the elongation direction, between a proximal end and a distal end, the distal end being separated from the tray in the deployed position of the extendible leaf, and being in contact with the tray in the withdrawn position of the extendible leaf, the rotatable leaf being mounted rotatably on said distal end.
- the rotatable leaf comprises an upper surface and a lower surface, the upper surface being flush with an upper surface of the tray when the rotatable leaf is in its idle position, the lower surface being arranged opposite a surface of the extendible leaf when the rotatable leaf is in its idle position, the lower surface having a convex curved profile, the lower surface of the rotatable leaf being configured to come into contact with the tray during the rotation of the rotatable leaf from its idle position to its deployed position.
- the rotatable leaf is articulated relative to the extendible leaf by a hinge, the hinge being configured to exert a resisting torque between the extendible leaf and the rotatable leaf.
- the tray has a protrusion opposite the rotatable leaf, and the rotatable leaf has a groove, said protrusion being able to be housed in said groove when the rotatable leaf is in the deployed position and the extendible leaf is in the withdrawn position.
- the upper surface of the rotatable leaf has a stationary bar.

BRIEF DESCRIPTION OF THE DRAWINGS

Other features and advantages of the invention will appear upon reading the following description, provided solely as an example and done in reference to the appended drawings, in which.

DETAILED DESCRIPTION OF THE PREFERRED EMBODIMENTS

Figure 1:
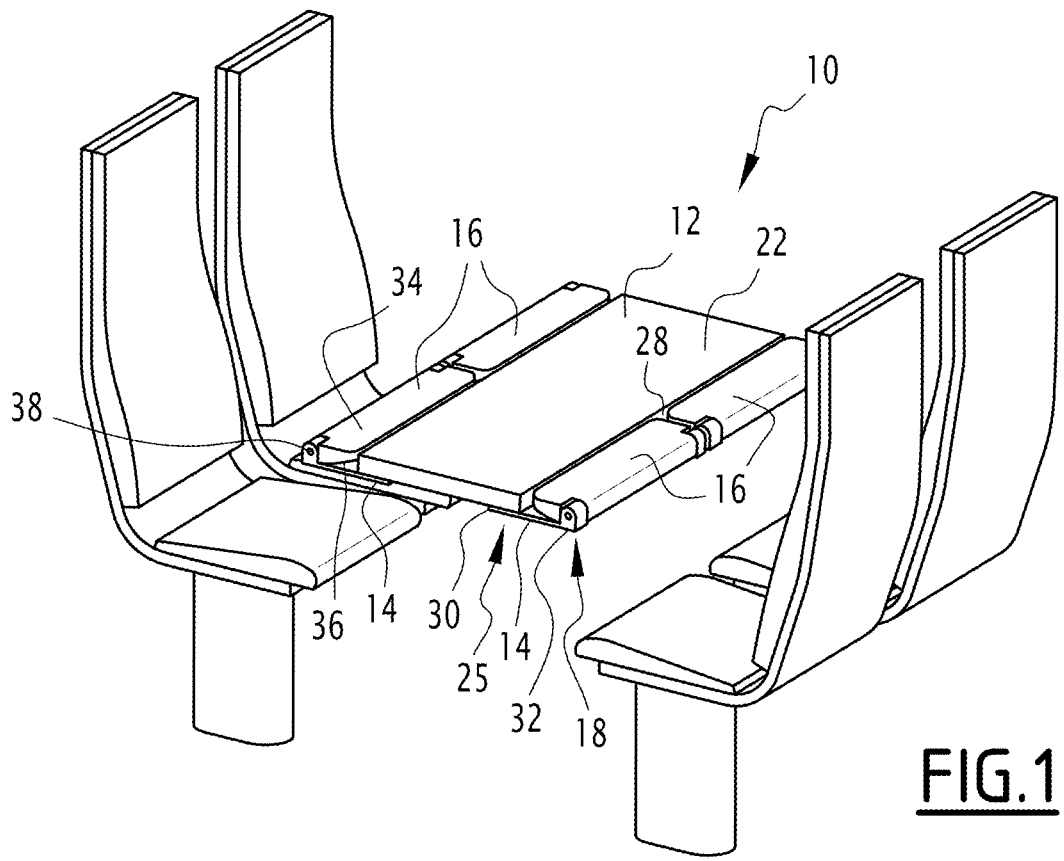
FIG. 1 is a perspective view of a table in use according to the invention, the rotatable leaf being in an idle position, and the extendible leaf being in the deployed position.

Hereinafter, "longitudinal" will refer to a direction or plane intended to extend, during use, orthogonally to the side wall of the railway vehicle, and "transverse" to a direction suitable for extending, during use, parallel to the side wall of the railway vehicle and in a horizontal plane.

The table 10 comprises a tray 12, at least one extendible leaf 14, at least one rotatable leaf 16, and coupling means 18, such as a hinge.

The tray 12 is suitable for being secured to the vehicle. It is fastened to a window (not shown in the figures) of the vehicle. In a variant, it is fastened to a floor (not shown in the figures) of the vehicle. In another variant, it is fastened to a window and to a floor of the vehicle at the same time.

The tray 12 can represent a main part of the table 10.

The tray 12 includes an upper surface 22 and a lower surface 24.

The tray 12 further comprises at least one guideway 25.

The upper and lower surfaces 22, 24 are substantially horizontal.

The guideway 25 is configured to receive the extendible leaf 14. The guideway 25 allows a translational movement in a transverse direction of the extendible leaf 14 relative to the tray 12 between a deployed position of the extendible leaf 14 and a withdrawn position of the extendible leaf 14 to the exclusion of any other movement.

The guideway 25 is configured to allow a free sliding of the extendible leaf 14.

Advantageously, the tray 12 also has a protrusion 26 protruding horizontally from one edge 28 of the tray 12. The protrusion 26 is opposite the rotatable leaf 16.

The protrusion 26 is capable of cooperating with the rotatable leaf 16, as described hereinafter.

The protrusion 26 for example has a semi-cylindrical shape. In a variant, the protrusion 26 has at least two facets.

The extendible leaf 14 extends, in the elongation direction of the tray 12, between a proximal end 30 and a distal end 32. In the deployed position of the extendible leaf 14, the distal end 32 is separated from the tray 12. In the withdrawn position of the extendible leaf 14, the distal end 32 is in contact with the tray 12.

The extendible leaf 14 is mounted translatably on the tray 12 between a deployed position and a withdrawn position. Advantageously, the extendible leaf 14 is mounted movably in rectilinear translation along a directly parallel to an elongation direction of the tray 12.

During use, the extendible leaf 14 is arranged opposite the abdomen of a seated passenger. More specifically, the distal end 32 of the extendible leaf 14 is arranged opposite the abdomen of a seated passenger.

The rotatable leaf 16 is mounted rotatably on the extendible leaf 14 between an idle position and a deployed position. Advantageously, the rotatable leaf 16 is mounted rotatably around a longitudinal axis on the distal end 32 of the extendible leaf 14.

The angle between the idle position and the deployed position of the rotatable leaf 16, relative to the extendible leaf 14, is between 80° and 95°, and is preferably substantially equal to 90°.

The rotatable leaf 16 is in direct contact with the tray 12 during its rotation from its idle position to its deployed position.

The rotatable leaf 16 comprises an upper surface 34 and a lower surface 36. The upper surface 34 is flush with the upper surface 22 of the tray 12 when the rotatable leaf 16 is in its idle position.

The lower surface 36 is arranged opposite a surface of the extendible leaf 14 when the rotatable leaf 16 is in its idle position.

The lower surface 36 of the rotatable leaf 16 is configured to come into contact with the tray 12 during the rotation of the rotatable leaf 16 from its idle position to its deployed position.

Advantageously, the lower surface 36 has a convex curved profile.

The lower surface 36 of the rotatable leaf 16 has a groove 40. The protrusion 26 is able to be housed in the groove 40 when the rotatable leaf 16 is in the deployed position.

During use, when the rotatable leaf 16 is in its deployed position, the rotatable leaf 16 extends substantially parallel to the lower part of the thorax at the abdomen of a seated passenger.

The coupling means 18 are configured to rotate the rotatable leaf 16 from its idle position to its deployed position when the extendible leaf 14 is translated from its deployed position to its withdrawn position.

Thus, an impact of a passenger on the extendible leaf 14, driving the translation of the extendible leaf 14 toward its withdrawn position, is further able to drive a rotation of the rotatable leaf 16 toward its deployed position.

The coupling means 18 comprise at least one hinge 38 that articulates the rotatable leaf 16 relative to the extendible leaf 14. Advantageously, the hinge 38 is mounted at the distal end 32 of the extendible leaf 14.

The hinge 38 for example incorporates an inner stop, preventing a rotation of the rotatable leaf 16 relative to the extendible leaf 14 past its deployed position.

Advantageously, the hinge 38 exerts a resisting torque between the extendible leaf 14 and the rotatable leaf 16.

The torque is configured so as to be able to keep the rotatable leaf 16 in several intermediate positions strictly comprised between the idle position and the deployed position, and to be able to be manipulated easily by a person wishing to pivot the rotatable leaf 16 relative to the extendible leaf 14, independently of the position of the extendible leaf 14 relative to the tray 12.

In one preferred configuration, the upper surface 34 of the rotatable leaf 16 has at least one stationary bar 42. The bar 42 is configured to maintain a tablet or mobile telephone on the upper surface 34 when the rotatable leaf 14 is in an inclined position, for example at 45°.

Figure 2:
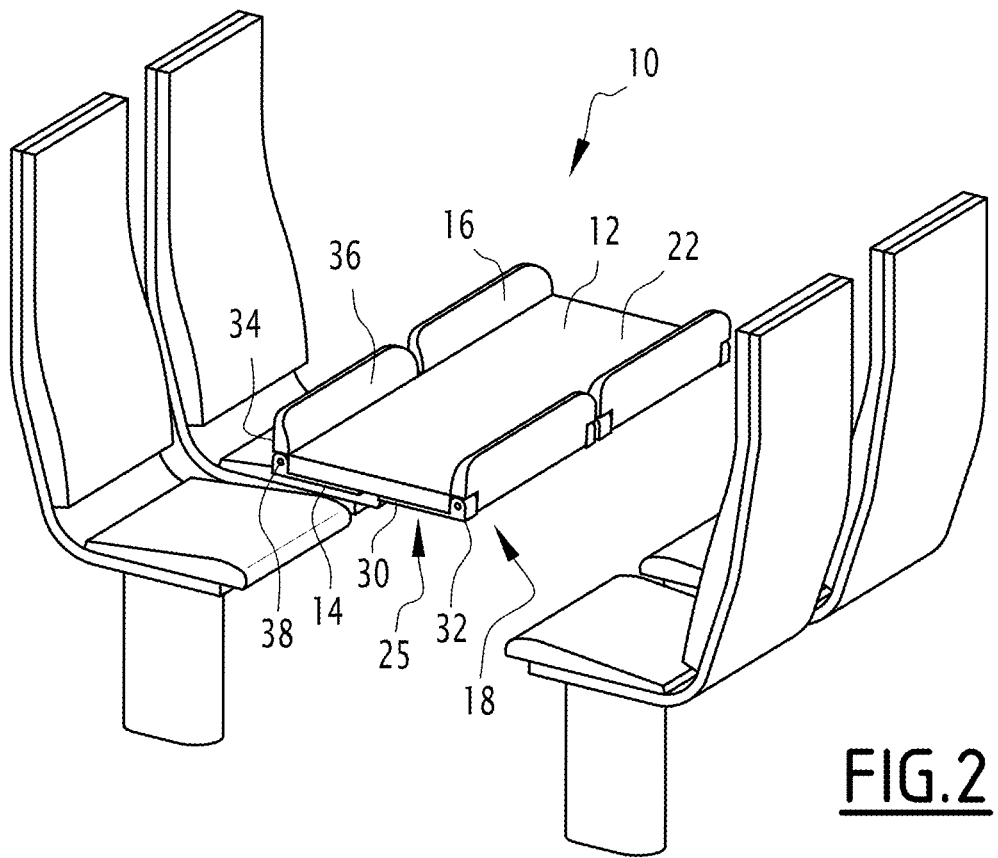
FIG. 2 is a perspective view of a table according to the invention, the rotatable leaf being in a deployed position, and the extendible leaf being in the withdrawn position.
Figure 3:
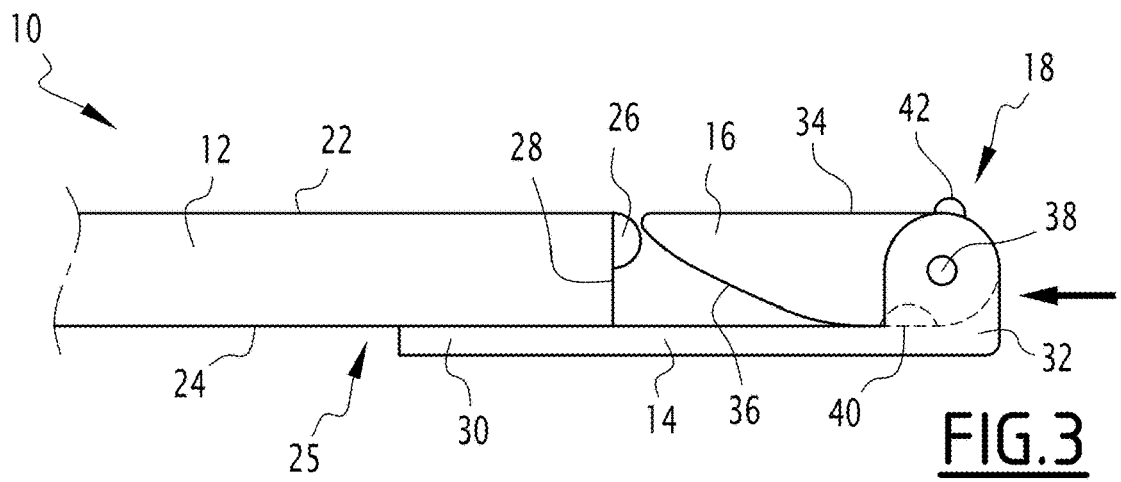
FIGS. 3 to 6 are consecutive views during the rotation of the rotatable leaf from its idle position to its deployed position, FIG. 3 showing the rotatable leaf in its idle position, FIG. 6 showing the rotatable leaf in its deployed position.
Figure 4:
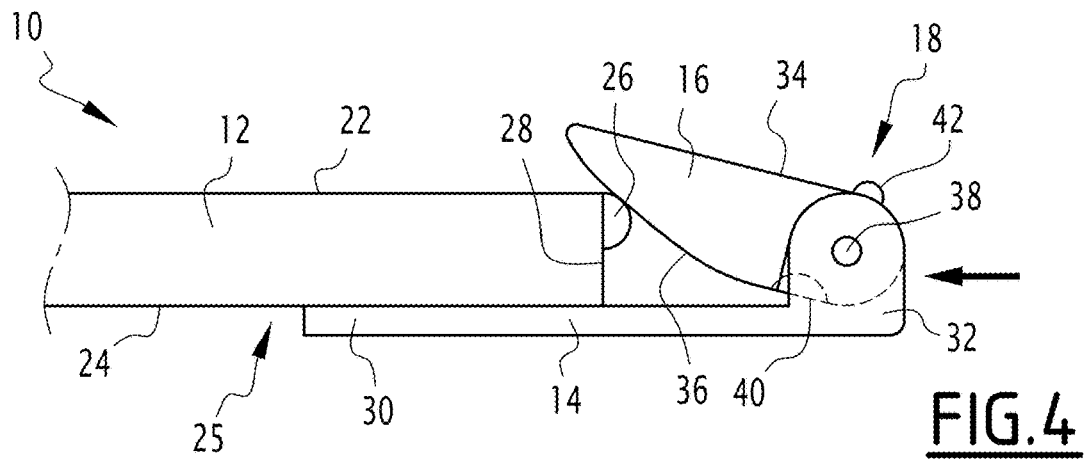
Figure 5:
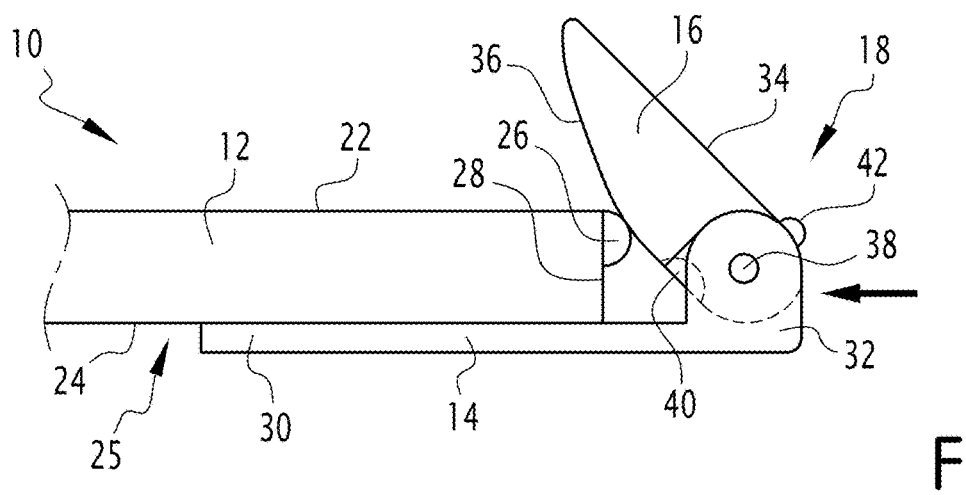
Figure 6:
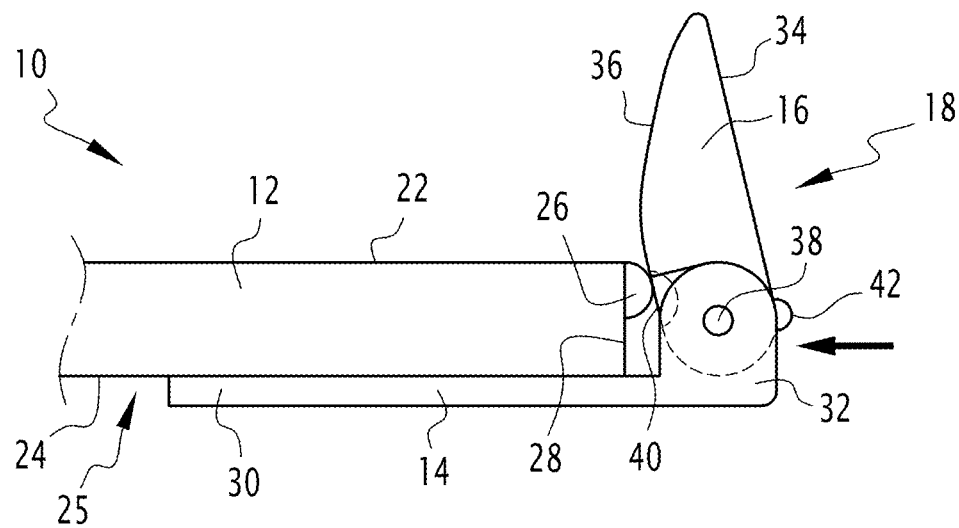
Figure 7:
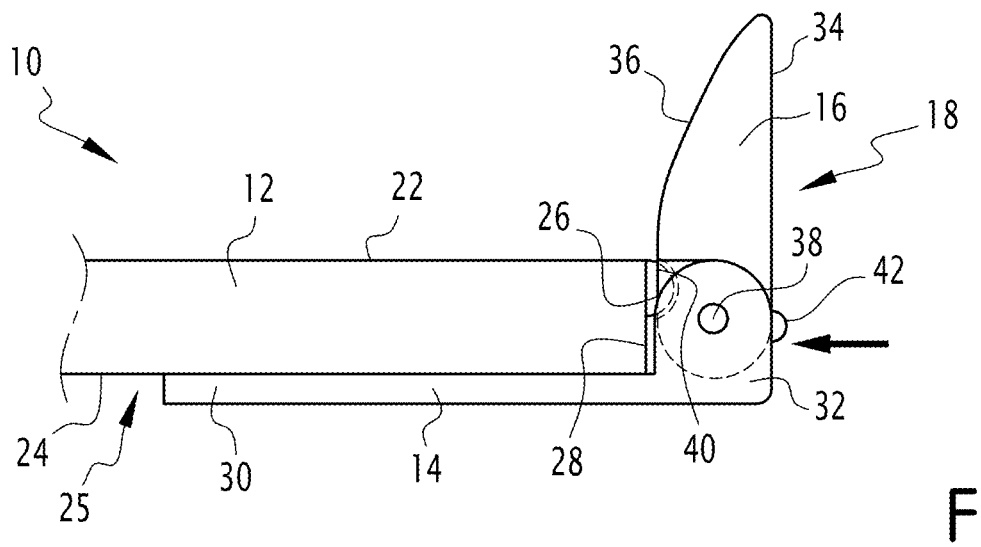
FIG. 7 is a view of a variant of the table of FIG. 4, the rotatable leaf further including a bar.

In one preferred configuration, four sets of two and three extendible and rotatable leaves 14 and 16 (respectively) are mounted on a tray, which serves as a common element 12, as illustrated in FIGS. 1 and 2. Each set of second and rotatable leafs 14, 16 is across from a seated passenger.

The operation of a table 10 according to the invention will now be described.

By default, during the use of the table 10, the rotatable leaf 16 occupies its idle position. A passenger is at a distance from the table 10.

During a sudden acceleration or deceleration, the passenger is projected toward the table 10 in the transverse direction and comes into contact with the distal end 32 of the extendible leaf 14. In this case, the passenger exerts a substantially horizontal force on the extendible leaf 14.

The extendible leaf 14 is translated relative to the tray 12, toward its withdrawn position, in particular into its withdrawn position.

As a result, the rotatable leaf 16 is rotated relative to the extendible leaf 14, owing to the coupling means 18, toward its deployed position, in particular into its deployed position.

Preferably, the extendible leaf 14 is not translated relative to the tray 12, toward its withdrawn position, unless the force exerted by the passenger on the table exceeds the threshold. In the illustrated embodiment, the extendible leaf 14 first translates the rotatable leaf 16, until the lower surface 36 of the rotatable leaf 16 comes into contact with the protrusion 26.

This contact causes a rotation of the rotatable leaf 16 relative to the extendible leaf 14 when the translation of the extendible leaf 14 toward the withdrawn position continues, until the protrusion 26 of the tray 12 becomes housed in the groove 40. The resistance exerted by the tray 12 on the rotatable leaf 16 interrupts the movement of the extendible leaf 14 and the rotatable leaf 16.

After such an incident, the table 10 can be returned to its initial configuration by exerting a horizontal force on the extendible leaf 14 toward the deployed position of the extendible leaf 14, and exerting a torque on the rotatable leaf 16 toward the idle position of the rotatable leaf 16.

Owing to the invention described above, passenger safety is better ensured, in particular during accidents. The passenger impact surface is increased, which decreases the pressure exerted by the tables on the passengers in case of impacts, and decreases the risks of passenger injury.

The table according to the invention further makes it possible to hold books or small electronic apparatuses with a selected incline of the rotatable leaf 16, and thus facilitates the activities of the passengers more ergonomically.

When the rotatable leaf 16 is in its deployed position, additional spaces are thus created to facilitate access to seated places for passengers with reduced mobility.

What is claimed is:

1. A table for a vehicle, comprising:
   a tray, suitable for being secured to the vehicle,
   at least one extendible leaf, mounted movably on the tray between a deployed position and a withdrawn position,
   wherein the extendible leaf is mounted translatably on the tray between the deployed position and the withdrawn position, and wherein the table further includes:
   at least one rotatable leaf mounted rotatably on the extendible leaf between an idle position and a deployed position,
   a hinge configured for coupling movements of the extendible and rotatable leafs, configured to rotate the rotatable leaf from its idle position to its deployed position when the extendible leaf is translated from its deployed position to its withdrawn position,
   wherein the rotatable leaf comprises an upper surface and a lower surface,
   the upper surface being flush with an upper surface of the tray when the rotatable leaf is in its idle position,
   the lower surface being arranged opposite a surface of the extendible leaf when the rotatable leaf is in its idle position, the lower surface having a convex curved profile,
   the lower surface of the rotatable leaf being configured to come into contact with the tray during the rotation of the rotatable leaf from its idle position to its deployed position.

2. The table according to claim 1, wherein the rotatable leaf is in direct contact with the tray during its rotation from its idle position to its deployed position.

3. The table according to claim 1, wherein the tray comprises at least one guideway configured to receive the extendible leaf, the guideway authorizing a translational movement of the extendible leaf relative to the tray between the deployed position and the withdrawn position to the exclusion of any other movement.

4. The table according to claim 1, wherein the angle between the idle position and the deployed position of the rotatable leaf is between 80° and 95°.

5. The table according to claim 1, wherein the extendible leaf is mounted movably in rectilinear translation along a direction parallel to an elongation direction of the tray.

6. The table according to claim 5, wherein the extendible leaf extends, along the elongation direction, between a proximal end and a distal end, the distal end being separated from the tray in the deployed position of the extendible leaf, and being in contact with the tray in the withdrawn position of the extendible leaf, the rotatable leaf being mounted rotatably on said distal end.

7. The table according to claim 1, wherein the rotatable leaf is articulated relative to the extendible leaf by the hinge, the hinge being configured to exert a resisting torque between the extendible leaf and the rotatable leaf.

8. The table according to claim 1, wherein the tray has a protrusion opposite the rotatable leaf, and the rotatable leaf has a groove, said protrusion being able to be housed in said groove when the rotatable leaf is in the deployed position and the extendible leaf is in the withdrawn position.

9. A table for a vehicle, comprising:
   a tray, suitable for being secured to the vehicle,
   at least one extendible leaf, mounted movably on the tray between a deployed position and a withdrawn position,
   wherein the extendible leaf is mounted translatably on the tray between the deployed position and the withdrawn position, and wherein the table further includes:
   at least one rotatable leaf mounted rotatably on the extendible leaf between an idle position and a deployed position,
   a hinge configured for coupling movements of the extendible and rotatable leafs, configured to rotate the rotatable leaf from its idle position to its deployed position when the extendible leaf is translated from its deployed position to its withdrawn position,
   wherein the rotatable leaf is articulated relative to the extendible leaf by the hinge, the hinge being configured to exert a resisting torque between the extendible leaf and the rotatable leaf such that the resisting torque enables keeping the rotatable leaf in several intermediate positions between the idle position and the deployed position.

10. A table for a vehicle, comprising:
    a tray, suitable for being secured to the vehicle,
    at least one extendible leaf, mounted movably on the tray between a deployed position and a withdrawn position,
    wherein the extendible leaf is mounted translatably on the tray between the deployed position and the withdrawn position, and wherein the table further includes:
    at least one rotatable leaf mounted rotatably on the extendible leaf between an idle position and a deployed position,
    a hinge configured for coupling movements of the extendible and rotatable leafs, configured to rotate the rotatable leaf from its idle position to its deployed position when the extendible leaf is translated from its deployed position to its withdrawn position,
    wherein the rotatable leaf comprises an upper surface and a lower surface,
    the upper surface being flush with an upper surface of the tray when the rotatable leaf is in its idle position,
    the lower surface being arranged opposite a surface of the extendible leaf when the rotatable leaf is in its idle position, the lower surface having a convex curved profile,
    the lower surface of the rotatable leaf being configured to come into contact with the tray during the rotation of the rotatable leaf from its idle position to its deployed position, and wherein the upper surface of the rotatable leaf has at least one stationary bar.

* * * * *